United States Patent
Bombet et al.

(10) Patent No.: US 7,649,704 B1
(45) Date of Patent: *Jan. 19, 2010

(54) DISK DRIVE DEFERRING REFRESH BASED ON ENVIRONMENTAL CONDITIONS

(75) Inventors: Marc A. Bombet, Trabuco Canyon, CA (US); William B. Boyle, Lake Forest, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 178 days.

This patent is subject to a terminal disclaimer.

(21) Appl. No.: 11/769,655

(22) Filed: Jun. 27, 2007

(51) Int. Cl.
*G11B 27/36* (2006.01)

(52) U.S. Cl. .................. 360/31; 360/60; 360/97.02

(58) Field of Classification Search ............... None
See application file for complete search history.

(56) References Cited

U.S. PATENT DOCUMENTS

| | | | |
|---|---|---|---|
| 4,642,715 A * | 2/1987 | Ende ............... | 360/97.02 |
| 4,949,036 A | 8/1990 | Bezinque et al. | |
| 5,487,077 A | 1/1996 | Hassner et al. | |
| 5,600,500 A | 2/1997 | Madsen et al. | |
| 5,651,131 A | 7/1997 | Chesley | |
| 5,682,273 A | 10/1997 | Hetzler | |
| 5,872,800 A | 2/1999 | Glover et al. | |
| 5,873,114 A | 2/1999 | Rahman et al. | |
| 5,909,334 A | 6/1999 | Barr et al. | |
| 5,923,485 A | 7/1999 | Ito | |
| 5,930,358 A | 7/1999 | Rao | |
| 5,941,998 A | 8/1999 | Tillson | |
| 6,052,804 A | 4/2000 | Thowe et al. | |
| 6,181,500 B1 | 1/2001 | Serrano et al. | |
| 6,266,199 B1 | 7/2001 | Gillis et al. | |
| 6,289,484 B1 | 9/2001 | Rothberg et al. | |
| 6,317,850 B1 | 11/2001 | Rothberg | |
| 6,327,106 B1 | 12/2001 | Rothberg | |
| 6,359,744 B1 | 3/2002 | Mallary | |
| 6,384,999 B1 | 5/2002 | Schibilla | |
| 6,393,511 B1 | 5/2002 | Albrecht et al. | |
| 6,429,984 B1 | 8/2002 | Alex | |
| 6,490,111 B1 | 12/2002 | Sacks | |
| 6,603,617 B1 | 8/2003 | Cross | |
| 6,606,211 B1 | 8/2003 | Lim et al. | |
| 6,628,466 B2 | 9/2003 | Alex | |
| 6,650,492 B2 | 11/2003 | Lenny et al. | |
| 6,661,597 B1 | 12/2003 | Codilian et al. | |
| 6,691,255 B1 | 2/2004 | Rothberg et al. | |
| 6,697,203 B1 | 2/2004 | Cheng et al. | |
| 6,714,368 B1 | 3/2004 | Himle et al. | |
| 6,747,827 B1 | 6/2004 | Bassett et al. | |
| 6,781,780 B1 | 8/2004 | Codilian | |
| 6,791,775 B2 | 9/2004 | Li et al. | |
| 6,798,591 B2 | 9/2004 | Barnett et al. | |
| 6,809,893 B2 * | 10/2004 | Uzumaki et al. ........... | 360/31 |
| 6,826,007 B1 | 11/2004 | Patton, III | |
| 6,854,022 B1 | 2/2005 | Thelin | |
| 6,854,071 B2 | 2/2005 | King et al. | |
| 6,862,505 B2 | 3/2005 | Satoh et al. | |

(Continued)

*Primary Examiner*—Jason C Olson
(74) *Attorney, Agent, or Firm*—Howard H. Sheerin, Esq.

(57) ABSTRACT

A disk drive is disclosed including a disk having a plurality of tracks, and a head actuated over the disk. A refresh monitor is maintained for refreshing data stored on the disk. A need for a refresh operation is detected when the refresh monitor exceeds a first threshold, wherein the refresh operation is deferred based on an environmental condition.

23 Claims, 5 Drawing Sheets

U.S. PATENT DOCUMENTS

| | | | |
|---|---|---|---|
| 6,892,249 | B1 | 5/2005 | Codilian et al. |
| 6,895,500 | B1 | 5/2005 | Rothberg |
| 6,898,033 | B2 | 5/2005 | Weinstein et al. |
| 6,947,234 | B2 | 9/2005 | Lamberts et al. |
| 6,948,102 | B2 | 9/2005 | Smith |
| 6,950,967 | B1 | 9/2005 | Brunnett et al. |
| 6,982,842 | B2 | 1/2006 | Jing et al. |
| 6,987,630 | B1 | 1/2006 | Higgins et al. |
| 6,995,933 | B1 | 2/2006 | Codilian et al. |
| 7,006,321 | B2 | 2/2006 | Kisaka |
| 7,024,614 | B1 | 4/2006 | Thelin et al. |
| 7,032,127 | B1 | 4/2006 | Egan et al. |
| 7,043,598 | B2 * | 5/2006 | Wu et al. .................... 711/106 |
| 7,050,252 | B1 | 5/2006 | Vallis |
| 7,057,839 | B2 | 6/2006 | Shikuma et al. |
| 7,076,604 | B1 | 7/2006 | Thelin |
| 7,082,494 | B1 | 7/2006 | Thelin et al. |
| 7,120,737 | B1 | 10/2006 | Thelin |
| 7,143,203 | B1 | 11/2006 | Altmejd |
| 7,173,782 | B2 * | 2/2007 | Ikeda et al. .................... 360/31 |
| 7,345,837 | B1 * | 3/2008 | Schreck et al. ................ 360/31 |
| 7,477,465 | B2 | 1/2009 | Yu |
| 7,599,139 | B1 | 10/2009 | Bombet et al. |
| 2001/0043424 | A1 | 11/2001 | Nguyen |
| 2003/0007269 | A1 | 1/2003 | Alex |
| 2003/0016461 | A1 | 1/2003 | Seng et al. |
| 2004/0153949 | A1 | 8/2004 | Ro et al. |
| 2004/0174627 | A1 | 9/2004 | Kim et al. |
| 2004/0252397 | A1 * | 12/2004 | Hodge et al. .................... 360/60 |
| 2004/0264028 | A1 * | 12/2004 | Ishii et al. ...................... 360/69 |
| 2004/0268033 | A1 | 12/2004 | Chia et al. |
| 2005/0036437 | A1 | 2/2005 | Learned et al. |
| 2005/0078393 | A1 | 4/2005 | Cho |
| 2005/0146803 | A1 | 7/2005 | Kim et al. |
| 2005/0188153 | A1 | 8/2005 | Yun et al. |
| 2005/0207049 | A1 | 9/2005 | Ikeda et al. |
| 2006/0066971 | A1 | 3/2006 | Alex et al. |
| 2006/0098318 | A1 | 5/2006 | Feng |
| 2006/0101197 | A1 | 5/2006 | Georgis et al. |
| 2006/0132954 | A1 | 6/2006 | Wada et al. |
| 2006/0198041 | A1 | 9/2006 | Kuwamura |
| 2007/0076315 | A1 | 4/2007 | McMurtrey |
| 2007/0223124 | A1 | 9/2007 | Amemiya |
| 2007/0277011 | A1 | 11/2007 | Tanaka et al. |

* cited by examiner

DISK DRIVE DEFERRING REFRESH BASED ON ENVIRONMENTAL CONDITIONS

BACKGROUND

1. Field

The present invention relates to disk drives for computer systems. In particular, the present invention relates to a disk drive that defers a refresh operation based on environmental conditions.

2. Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo control system to control the velocity of the actuator arm as it seeks from track to track.

During a write operation, a current is applied to a write element of the head (e.g., a write coil) to create a magnetic field which magnetizes the surface of the disk by orienting the direction of magnetic grains (e.g., horizontally in longitudinal magnetic recording, or vertically in perpendicular magnetic recording). The orientation of the grains exhibits hysteresis thereby generating their own magnetic field when the write magnetic field is removed. During a read operation, a read element of the head (e.g., a magnetoresistive element) transduces the magnetic field emanating from the disk surface into a read signal that is demodulated into an estimated data sequence.

The hysteresis of the magnetic grains is not permanent meaning that over time the grains will orientate into random directions (magnetic entropy) until the magnetic field is no longer sensed reliably (leading to data errors during reproduction). Magnetic entropy may also be precipitated by various factors, such as increasing ambient temperature. That is, at higher temperatures the uniform alignment of the grains will degrade faster. Another factor that precipitates magnetic entropy is a phenomenon referred to as adjacent track interference (ATI) wherein when writing data to a target track, the fringe field from the write element degrades the uniform alignment of the grains recorded in an adjacent track. The degrading effect of ATI on the adjacent tracks compounds over time with each write operation to the target track. Eventually, the magnetic field emanating from the disk surface will deteriorate to the point that the data is no longer recoverable.

There is, therefore, a need for an improved reliability disk drive that compensates for magnetic entropy.

SUMMARY OF THE EMBODIMENTS OF THE INVENTION

An embodiment of the present invention comprises a disk drive including a disk having a plurality of tracks, and a head actuated over the disk. A refresh monitor is maintained for refreshing data stored on the disk. A need for a refresh operation is detected when the refresh monitor exceeds a first threshold, wherein the refresh operation is deferred based on an environmental condition.

In one embodiment, the refresh monitor is adjusted in response to the environmental condition, and the data is refreshed in response to the adjusted refresh monitor.

In another embodiment, the environmental condition comprises at least one of an ambient temperature, a vibration, and an altitude.

In yet another embodiment, a history of the environmental condition is maintained, and the refresh monitor is adjusted based on the history of the environmental condition. In one embodiment, the history of the environmental condition is evaluated to determine whether to defer the refresh operation. In another embodiment, the history of the environmental condition is evaluated to determine how long to defer the refresh operation.

In still another embodiment, the refresh operation is forced when the refresh monitor exceeds a second threshold.

In another embodiment, the refresh operation is aborted based on the environmental condition.

In yet another embodiment, the disk comprises a plurality of refresh zones, and a refresh monitor is maintained for each refresh zone.

Another embodiment of the present invention comprises a method of operating a disk drive, the disk drive comprising a disk including a plurality of tracks, and a head actuated over the disk. A refresh monitor is maintained for refreshing data stored on the disk. A need for a refresh operation is detected when the refresh monitor exceeds a first threshold, wherein the refresh operation is deferred based on an environmental condition.

DETAILED DESCRIPTION OF EMBODIMENTS OF THE INVENTION

Figure 1A:
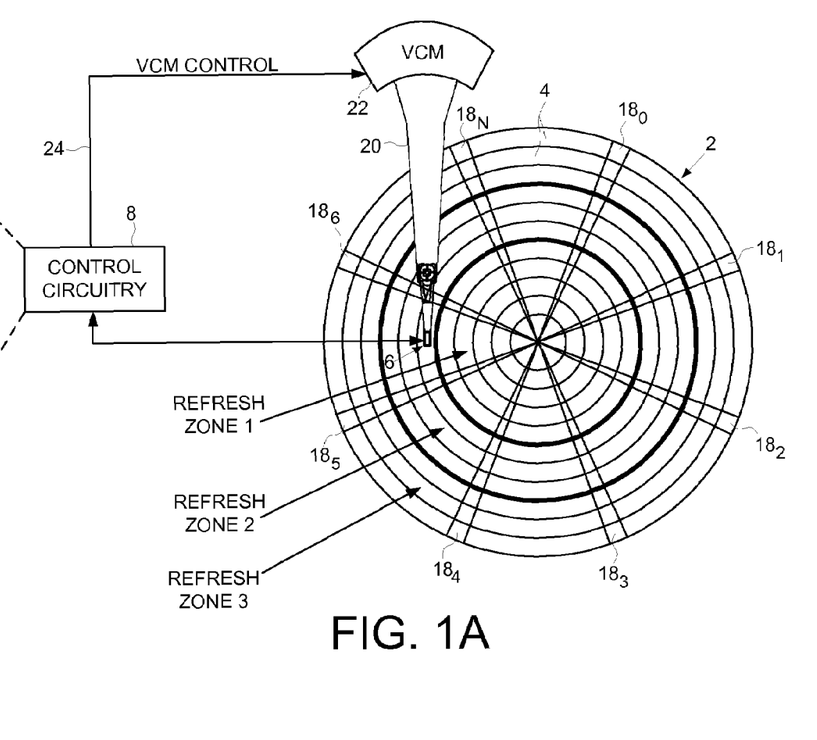
FIG. 1A shows a disk drive according to an embodiment of the present invention comprising a disk, a head actuated over the disk, and control circuitry.

FIG. 1A shows a disk drive according to an embodiment of the present invention comprising a disk 2 having a plurality of tracks 4, and a head 6 actuated over the disk 2. The disk drive further comprises control circuitry 8 for executing the flow diagram of FIG. 1B to refresh data stored on the disk 2. A need for a refresh operation is detected (step 10) when a refresh monitor exceeds a threshold, wherein the refresh operation is deferred based on an environmental condition (step 12). That is, if the environmental condition is within an acceptable range, the refresh operation is performed (step 14), otherwise the refresh operation is deferred (step 16).

In the embodiment of FIG. 1A, the disk 2 comprises a plurality of embedded servo sectors $18_0$-$18_N$ that define the plurality of data tracks 4. The head 6 is connected to a distal end of an actuator arm 20 which is rotated about a pivot by a voice coil motor (VCM) 22 in order to actuate the head 6 radially over the disk 2. The control circuitry 8 processes the read signal emanating from the head 6 to demodulate the information in the embedded servo sectors. The demodulated servo information (position error signal) is then processed (e.g., using appropriate compensation filtering) to generate a position control signal 24 applied to the VCM 22 in order to position the head 6 over a target data track (seek to the target data track and track the centerline of the target data track). In one embodiment, each data track is partitioned into a number of data sectors, wherein write/read operations are performed on one or more data sectors at a time.

FIG. 1A also shows in one embodiment that the data tracks 4 may be banded together into a plurality of refresh zones from the inner to outer diameter of the disk. However, the refresh zones may be defined in any suitable manner, including to define the refresh zone relative to logical block addresses or physical block addresses. In one embodiment, the refresh zones may extend across multiple disk surfaces.

Figure 2A:
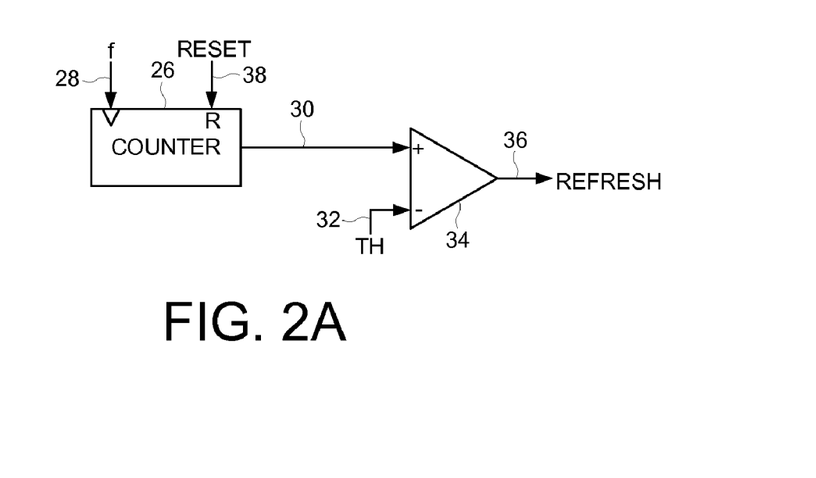
FIG. 2A shows a refresh monitor according to an embodiment of the present invention.

FIG. 2A shows a refresh monitor that may be implemented by control circuitry 8 according to an embodiment of the present invention, comprising a refresh interval counter 26 clocked at a frequency f 28 in order to track a refresh interval. When the output 30 of the refresh interval counter 26 exceeds a threshold 32 at comparator 34, a refresh signal 36 is activated in order to refresh the data stored on the disk 2. When the refresh operation is completed, a reset signal 38 resets the refresh interval counter 26. In the embodiment wherein the disk 2 comprises a plurality of refresh zones, the refresh monitor may be duplicated for each refresh zone. Other suitable refresh monitors may be used.

Any suitable environmental condition may be evaluated in the embodiments of the present invention for deferring the refresh operation. In one embodiment, the environmental condition affects the quality of the write operation, and may comprise, for example, at least one of an ambient temperature, a vibration, and an altitude of the disk drive. The ambient temperature may be measured generally for the entire disk drive, or it may be measured locally for each head in the disk drive. The vibrations to the disk drive may be detected using any suitable technique, such as by monitoring the position error signal generated from reading the embedded servo sectors $18_0$-$18_N$, or by using a suitable accelerometer. Similarly, the altitude of the disk drive may be measured using a suitable altimeter.

Figure 3A:
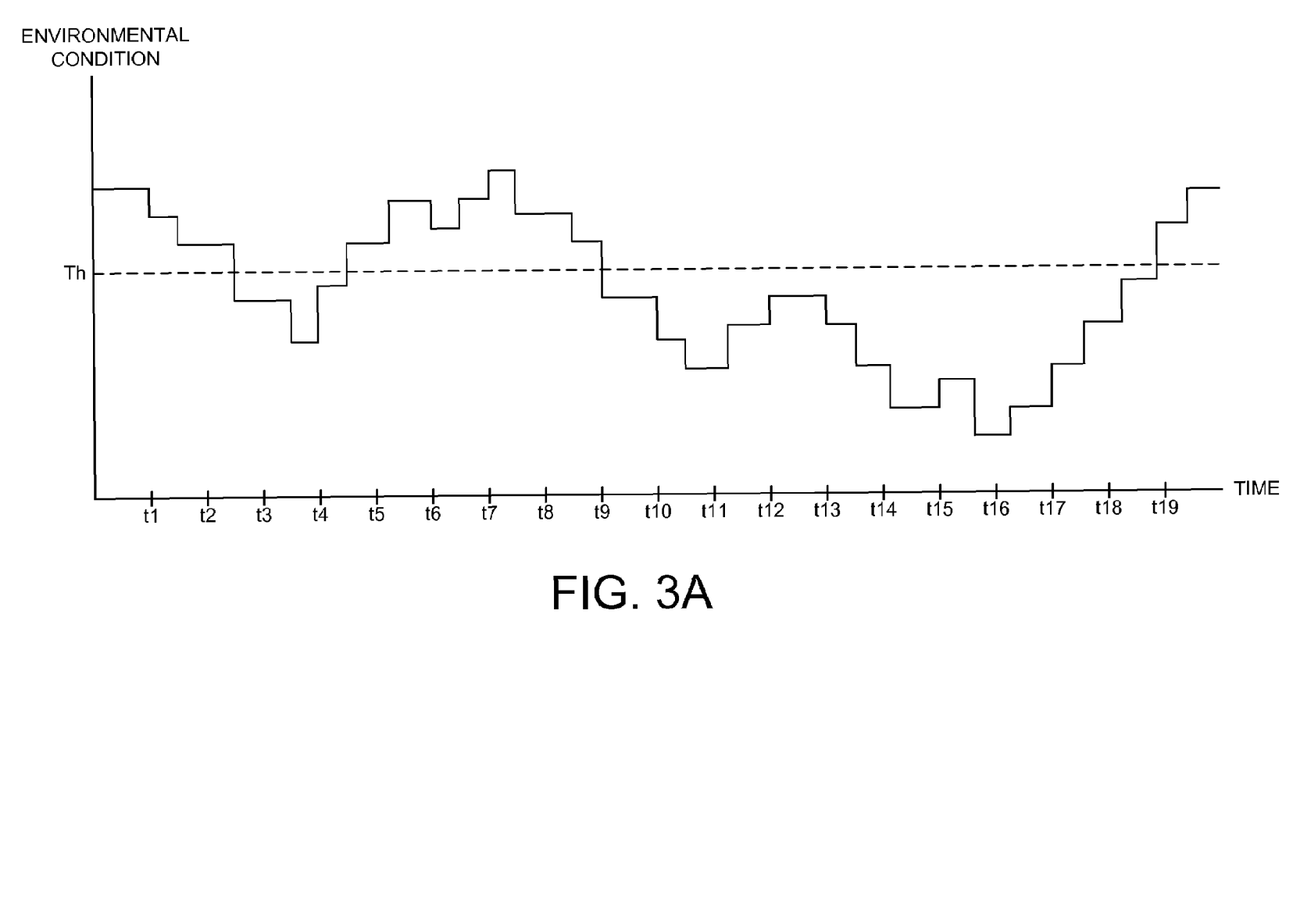
FIG. 3A shows a graph of an environmental condition wherein the refresh operation is deferred relative to a threshold.
Figure 3B:
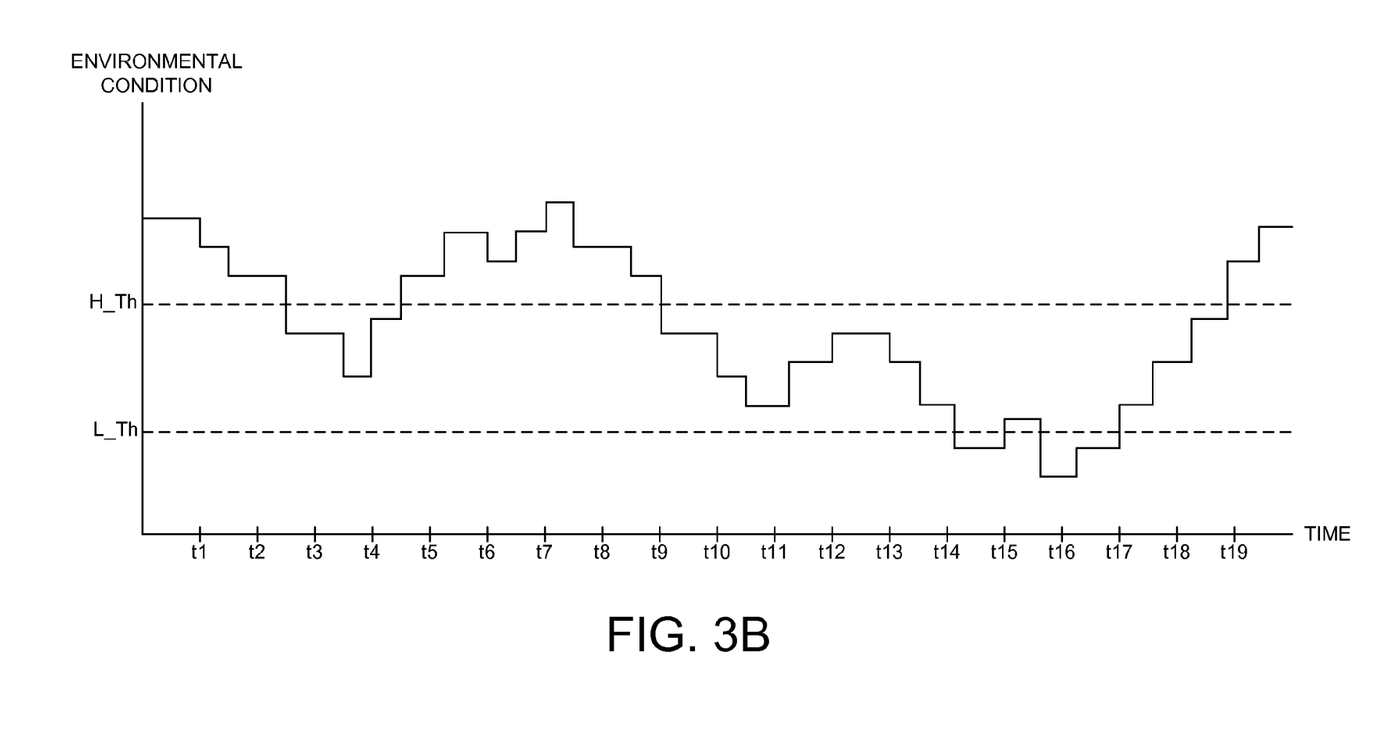
FIG. 3B shows a graph of an environmental condition wherein the refresh operation is deferred relative to a range.

FIG. 3A is an exemplary graph of an environmental condition relative to a threshold, wherein the refresh operation may be deferred if the environmental condition exceeds the threshold (either above or below depending on the characteristic of the operating condition). FIG. 3B is an exemplary graph of an environmental condition relative to two thresholds, wherein the refresh operation may be deferred if the environmental is either inside or outside a predetermined range again depending on the characteristic of the operating condition. For example, if the operating condition is ambient temperature, the refresh operation may be deferred until the ambient temperature is within a predetermined range (temperature above a high threshold reduces the write quality due to lower coercivity, and temperature below a low threshold reduces the write quality by reducing the overwrite capability).

In one embodiment, a history of the environmental condition is maintained, and the refresh monitor is adjusted based on the history of the environmental condition. For example, in one embodiment the history of the environmental condition is evaluated to determine whether to defer the refresh operation. Referring to FIG. 3A, if the refresh monitor indicates a need to refresh at time t18, the refresh operation may be deferred since the environmental condition is trending upward toward the threshold. For example, the ambient temperature may be trending upward toward the threshold wherein the refresh operation would have been deferred. In this manner, the refresh operation can be deferred rather than aborted if the environmental condition exceeds the threshold during the refresh operation.

In another embodiment, the history of the environmental condition is evaluated to determine how long to defer the refresh operation. For example, the history of the environmental condition may be evaluated to determine a time during the day that the environmental condition is likely to remain within an acceptable range while performing the refresh operation. For example, the history of the environmental condition may indicate that the ambient temperature is within an acceptable range between three and four in the morning, and therefore the refresh operation is deferred until this time.

The refresh operation may be deferred in any suitable manner. In an embodiment shown in FIG. 2B that may be implemented by control circuitry 8, the refresh monitor comprises three comparators 40A-40C, wherein comparator 40B generates a refresh signal 36 when the output of adder 42 exceeds a first threshold 44. The refresh monitor further comprises an ambient temperature biasing counter 46 which outputs a value 48 proportional to the ambient temperature 50 (the ambient temperature 50 adjusts the output frequency 51 of a frequency generator 53 which clocks the counter 46), and a write frequency biasing counter 52 which outputs a value 54 proportional to the number of writes 56 to the corresponding refresh zone. The biasing values 48 and 54 are combined at adder 58, and the output 60 is used to bias the output 30 of the refresh interval counter 26 at adder 42. Biasing the refresh interval in response to the ambient temperature and number of writes helps compensate for the precipitating affect that these factors have on magnetic entropy.

Figure 2B:
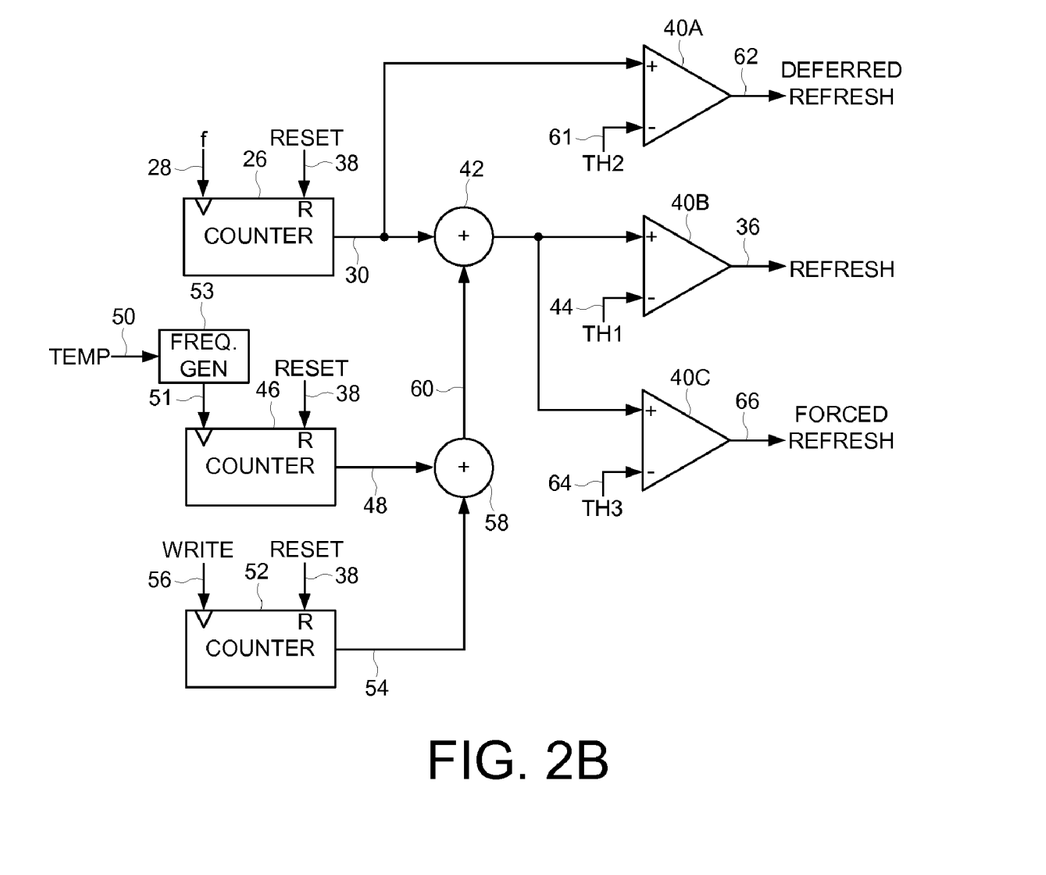
FIG. 2B shows a refresh monitor according to an embodiment of the present invention wherein the refresh interval is biased by the ambient temperature and the number of writes to the refresh zone.

If the refresh signal is activated, and the environmental condition is not in an acceptable range, then the refresh operation may be deferred by selecting a suitable value for a second threshold 61 input into comparator 40A. A deferred refresh signal 62 is then activated when the output 30 of the interval counter 26 exceeds the second threshold 61. For example, as described above, in one embodiment the value is selected for the second threshold 61 so that the deferred refresh signal 62 is activated at a preferred time relative to the history of the environmental condition. If the deferred refresh signal is activated, and the environmental condition is still in an unacceptable range, the refresh operation may be deferred yet again by adjusting the value for the second threshold 61. If at some point the output of adder 42 exceeds a third threshold 64, comparator 40C generates a forced refresh signal 66 which may force a refresh operation to occur independent of the environmental condition. In an alternative embodiment, the output of adder 42 is compared to threshold TH2 61 by comparator 40A.

Figure 4:
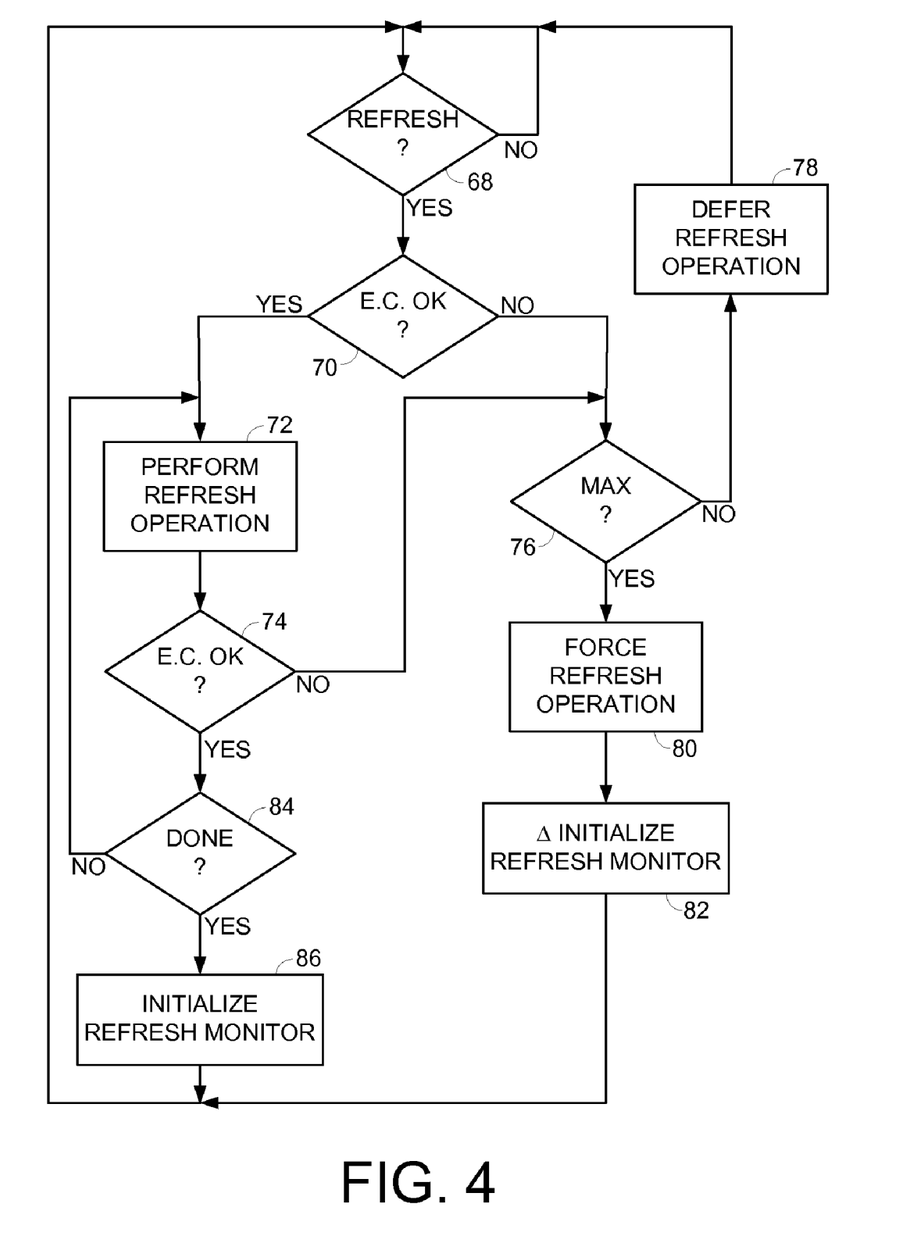
FIG. 4 is a flow diagram according to an embodiment of the present invention wherein the refresh operation may be forced or aborted, and the refresh monitor is initialized based on the environmental condition.

FIG. 4 shows a flow diagram that may be executed by the control circuitry 8 according to an embodiment of the present invention, wherein if the refresh signal is activated (step 68), the environmental condition is evaluated (step 70). If the environmental condition is acceptable, then the refresh operation is initiated (step 72). If during the refresh operation the environmental condition becomes unacceptable (step 74), and the forced refresh signal is not activated (step 76), then the refresh operation is aborted and deferred (step 78). When the deferred refresh signal is activated (step 68), the refresh operation is either restarted from the beginning or from the point where the refresh operation was previously aborted.

If the environmental condition is unacceptable when a refresh signal is activated (step 70), and the forced refresh signal is not activated (step 76), then the refresh operation is deferred (step 78). However, if the environmental condition is unacceptable when a refresh signal is activated (step 70), and the forced refresh signal is activated (step 76), then a forced refresh operation is performed (step 80). After performing the forced refresh operation, the refresh monitor is initialized (step 82) with a next refresh interval in response to the current environmental condition. For example, if the ambient temperature was above a high threshold during at least part of the forced refresh operation, the refresh monitor may be initialized to decrease the next refresh interval to help compensate for the less than optimal write quality during the refresh operation. If a normal refresh operation completes successfully (step 84), then the refresh monitor may be initialized with a nominal refresh interval (step 86). The refresh monitor may be initialized in any suitable manner, such as by selecting a suitable value for the first threshold 44 in FIG. 2B, by adjusting the clocking frequency 28 for the refresh interval counter 26, or by adjusting the increment value for the refresh interval counter 26.

Figure 1B:
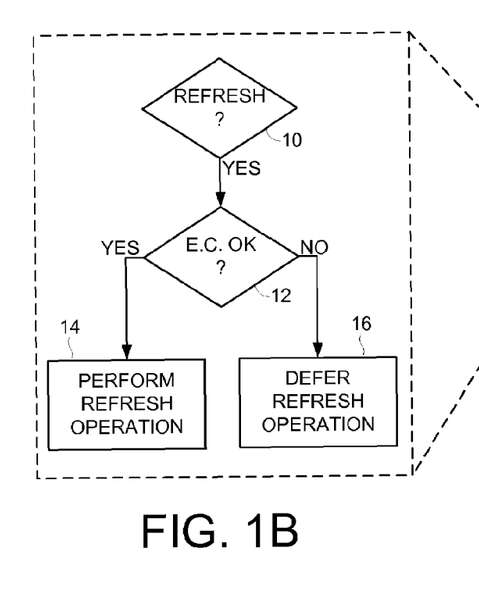
FIG. 1B is a flow diagram executed by the control circuitry for deferring a refresh operation based on an environmental condition.

As one of ordinary skill in the art will appreciate, the steps illustrated in FIGS. 1B and 4 may be performed in any appropriate order, or certain steps may be deleted without departing from the spirit and scope of the present invention.

Any suitable control circuitry 8 may be employed in the embodiments of the present invention, such as any suitable integrated circuit or circuits. For example, the control circuitry 8 may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry 8 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk 2 and read into a volatile semiconductor memory when the disk drive is powered on. In yet another embodiment, the control circuitry 8 comprises suitable logic circuitry, such as state machine circuitry.

What is claimed is:

1. A disk drive comprising:
   a disk comprising a plurality of tracks;
   a head actuated over the disk; and
   control circuitry operable to:
   maintain a refresh monitor operable to refresh data stored on the disk; and
   when the refresh monitor exceeds a first threshold:
   perform the refresh operation when an environmental condition falls within a predetermined range; and
   defer the refresh operation when the environmental condition is outside the predetermined range.

2. The disk drive as recited in claim 1, wherein the control circuitry is further operable to:
   adjust the refresh monitor in response to the environmental condition; and
   refresh the data in response to the adjusted refresh monitor.

3. The disk drive as recited in claim 1, wherein the environmental condition comprises an ambient temperature.

4. The disk drive as recited in claim 1, wherein the environmental condition comprises a vibration.

5. The disk drive as recited in claim 1, wherein the environmental condition comprises an altitude.

6. The disk drive as recited in claim 1, wherein the control circuitry is further operable to:
   maintain a history of the environmental condition; and
   adjust the refresh monitor based on the history of the environmental condition.

7. The disk drive as recited in claim 6, wherein the control circuitry evaluates the history of the environmental condition to determine whether to defer the refresh operation.

8. The disk drive as recited in claim 7, wherein the control circuitry evaluates the history of the environmental condition to determine how long to defer the refresh operation.

9. The disk drive as recited in claim 1, wherein the control circuitry is further operable to force the refresh operation when the refresh monitor exceeds a second threshold.

10. The disk drive as recited in claim 1, wherein the control circuitry is further operable to abort the refresh operation based on the environmental condition.

11. The disk drive as recited in claim 1, wherein the disk comprises a plurality of refresh zones, and the control circuitry is further operable to maintain a refresh monitor for each refresh zone.

12. A method of operating a disk drive, the disk drive comprising a disk including a plurality of tracks, and a head actuated over the disk, the method comprising:
    maintaining a refresh monitor operable to refresh data stored on the disk; and
    when the refresh monitor exceeds a first threshold:
    performing the refresh operation when an environmental condition falls within a predetermined range; and
    deferring the refresh operation when the environmental condition is outside the predetermined range.

13. The method as recited in claim 12, further comprising:
    adjusting the refresh monitor in response to the environmental condition; and
    refreshing the data in response to the adjusted refresh monitor.

14. The method as recited in claim 12, wherein the environmental condition comprises an ambient temperature.

15. The method as recited in claim 12, wherein the environmental condition comprises a vibration.

16. The method as recited in claim 12, wherein the environmental condition comprises an altitude.

17. The method as recited in claim 12, further comprising:
    maintaining a history of the environmental condition; and
    adjusting the refresh monitor based on the history of the environmental condition.

18. The method as recited in claim 17, further comprising evaluating the history of the environmental condition to determine whether to defer the refresh operation.

19. The method as recited in claim 18, further comprising evaluating the history of the environmental condition to determine how long to defer the refresh operation.

20. The method as recited in claim 12, further comprising forcing the refresh operation when the refresh monitor exceeds a second threshold.

21. The method as recited in claim 12, further comprising aborting the refresh operation based on the environmental condition.

22. The method as recited in claim 12, wherein the disk comprises a plurality of refresh zones, and further comprising maintaining a refresh monitor for each refresh zone.

23. A disk drive comprising:
  a disk comprising a plurality of tracks;
  a head actuated over the disk;
  a means for maintaining a refresh monitor operable to refresh data stored on the disk; and
  when the refresh monitor exceeds a threshold:
    a means for performing the refresh operation when an environmental condition falls within a predetermined range; and
    a means for deferring the refresh operation when the environmental condition is outside the predetermined range.

* * * * *